E. A. BARBET.
PROCESS AND APPARATUS FOR THE CONTINUOUS RECTIFICATION OF SPIRITS, PETROLEUM, AND BENZENE
APPLICATION FILED APR. 7, 1914.

1,319,319.

Patented Oct. 21, 1919.
3 SHEETS—SHEET 1.

E. A. BARBET.
PROCESS AND APPARATUS FOR THE CONTINUOUS RECTIFICATION OF SPIRITS, PETROLEUM, AND BENZENE.
APPLICATION FILED APR. 7, 1914.

1,319,319.

Patented Oct. 21, 1919.
3 SHEETS—SHEET 2.

E. A. BARBET.
PROCESS AND APPARATUS FOR THE CONTINUOUS RECTIFICATION OF SPIRITS, PETROLEUM, AND BENZENE.
APPLICATION FILED APR. 7, 1914.

1,319,319. Patented Oct. 21, 1919.

Witnesses:
M. J. Whittaker
G. McHulst

Inventor:
Emile Augustin Barbe
per
H. W. Waghorn
Attorney.

UNITED STATES PATENT OFFICE.

EMILE AUGUSTIN BARBET, OF PARIS, FRANCE.

PROCESS AND APPARATUS FOR THE CONTINUOUS RECTIFICATION OF SPIRITS, PETROLEUM, AND BENZENE.

1,319,319.      Specification of Letters Patent.      Patented Oct. 21, 1919.

Application filed April 7, 1914. Serial No. 830,178.

*To all whom it may concern:*

Be it known that I, EMILE AUGUSTIN BARBET, of 5 Rue de l'Echelle, in the city of Paris, Republic of France, have invented Processes and Apparatus for the Continuous Rectification of Spirits, Petroleum, and Benzene, of which the following is a full, clear, and exact description.

The present invention relates to a process for the continuous distillation of liquids, the boiling point of which gradually increases as the application of heat continues, in which process the liquid distilled is fractionated into portions having different boiling points.

In many cases where a liquid consisting of a mixture of miscible ingredients is subjected to heat under constant pressure the boiling point of the liquid increases gradually in wide limits as the application of heat continues, the constituents of the liquid being removed in the order of their volatility. This is the case, for example, with unrefined petroleums, petroleum spirits, crude benzene, etc. For example, when American petroleum is distilled at atmospheric pressure, the boiling point of the liquid rises from about 60° C. at the beginning to about 340–350° C. at the end of the distillation.

It is the object of this invention to utilize the gradual increase in boiling point of the liquid, increase the efficiency of the distilling operation and the economy in heat required for conducting it, and to make possible a reduction in the space required for the apparatus used.

In so-called multiple-effect distillation, the principle that a reduction of pressure over a liquid causes a decrease in its boiling point is utilized to increase the efficiency and heat economy of the operation, the vapors from the liquid boiling at one pressure heating the liquid at a lower pressure to its boiling point. It is a further object of the invention to adapt this means of effecting the increased efficiency and economy of operation to liquids having a gradually increasing boiling point when heated at a constant pressure.

In accordance with the present invention, there is a simultaneous distillation and fractionation of a liquid, for example, American petroleum by a multiple effect operation, the vapors from segregated units of the liquid heating other units having lower boiling points, the vapors from which, in turn, heat those having still lower boiling points. Since the removal of the more volatile constituents causes an increase in the boiling point of the liquid, it is caused to progress continuously during the course of the process, the vapors given off from each unit being caused to condense separately, either in the performance of their heating function or by other condensing means. Thus a continuous distillation and fractional condensation is effected. The entire operation may take place under atmospheric pressure, or under reduced pressure, or partially under atmospheric pressure and partially under reduced pressure. By the use of two distilling systems, each a "triple-effect" system, the first operating under atmospheric pressure and the second under reduced pressure, it has been found possible to effect a continuous fractional distillation of American petroleum into eleven fractions.

In the accompanying drawings.

Figure 1:
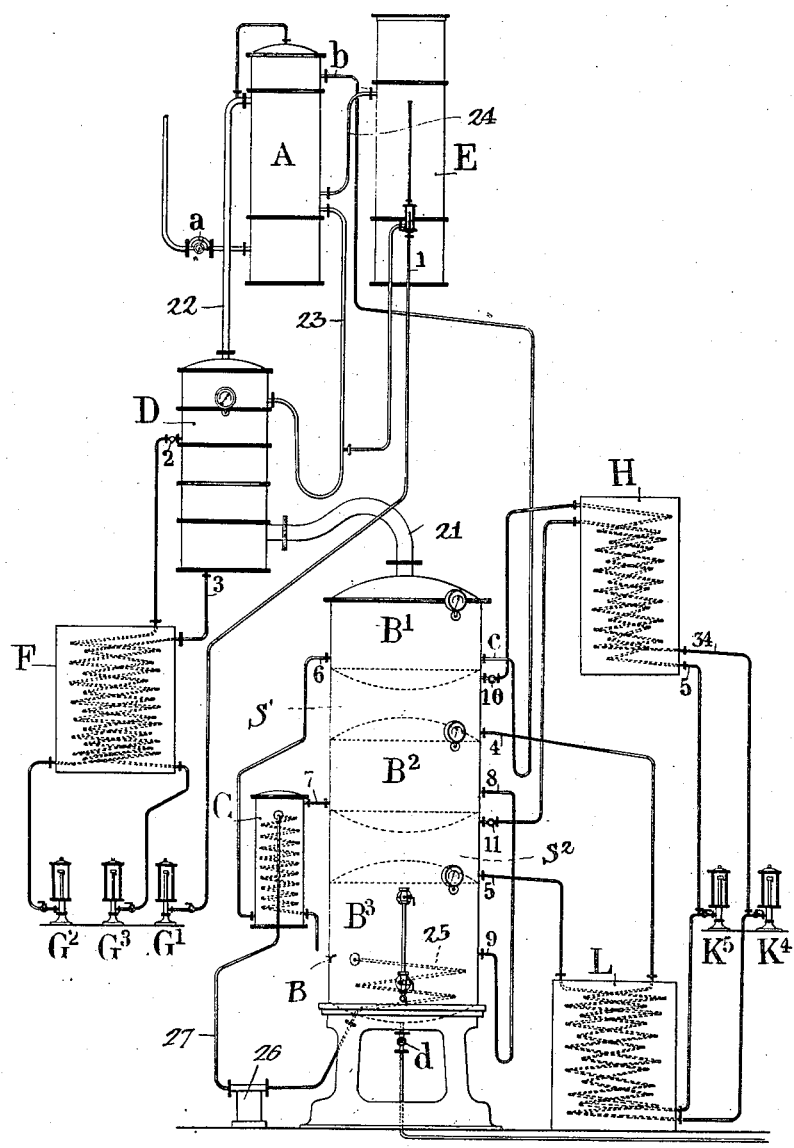
Figure 1 is a diagrammatic view of the still and other apparatus for the operation at atmospheric pressure.
Figure 2:
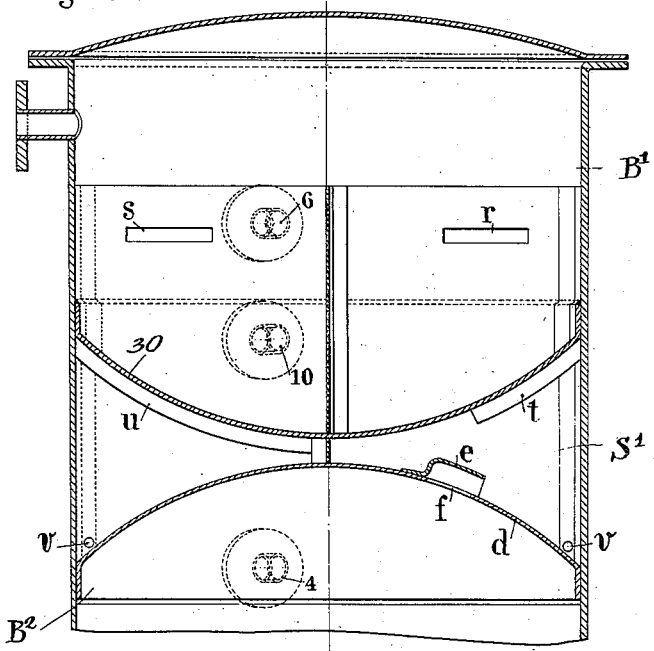
Figs. 2 and 3 are, respectively, vertical and horizontal sections of the still used in both operations.
Figure 3:
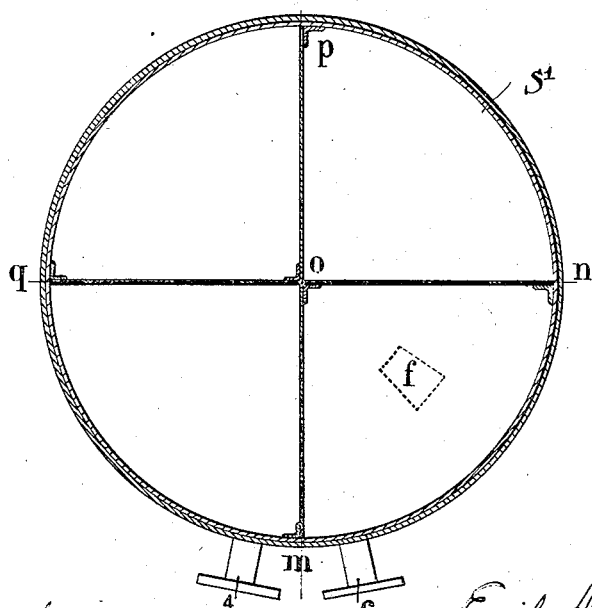

In Figs. 1, 2 and 3, B is the distilling cylinder which is formed of three vertically disposed stills, B', B², B³, separated by the vapor chambers S', S².

The unrefined petroleum passes through control cock $a$ into heater A, and from heater A into the upper still B' of the cylinder B by means of siphon tube $b$ $c$. The bottom of still B' is outwardly convex and is heated by the vapors in chamber S', which vapors are evolved from the liquid in still B². The relative arrangement of these stills is more fully shown in Figs. 2 and 3.

The bottom 3C of still B' and the top of still B² are both outwardly convex, and between them is provided the vapor chamber S'. A vapor outlet $f$ is provided in the top $d$ of still B², this port being covered by a head e. Such of the vapors as condense in chamber S' flow to its periphery and are withdrawn therefrom.

In order to provide for a circulation of the petroleum in the still, the latter is divided into four quadrants by four radial wells or baffle plates m o, n o, p o, q o (Fig. 3) which do not extend entirely to the top of the still, wall m o being entirely closed, the unrefined petroleum entering through c into quadrant m o n, passes through port r of plate n o, thence in the same manner through plate p o, and finally through opening s in plate q o into quadrant q o m. From this quadrant it makes its exit by means of pipe 6.

In order that the vapor may also be caused to travel in a definite path through the vapor chamber S', the radial plates are extended through still bottom 30 downwardly therein, thus forming four quadrants in S'. The vapor enters through opening f into quadrant m o n, through hole t in plate n o into the next quadrant through plate p o in like manner, and finally through opening u in q o. To provide for the collection of the condensed vapors openings v are provided at the lower portion of the radial plates, the collected liquid passing out through outlet 4. Pipe 10 at top of the vapor chamber S' forms the outlet for the uncondensed vapors. By the means described, the petroleum in still B' and the vapor in space S' are caused to travel through a definite path and the maximum heating and evaporating effect is obtained.

The petroleum, having entered still B', passes therethrough in the manner above described, and is heated by the vapors issuing from still $B^2$ into space S'. The petroleum begins to boil, and the vapors evolved pass out through pipe 21 into the bottom of the short condensing plate column D, where they are separated into three fractions. (1) The most volatile spirits (density about 0.66) pass out of the top of column D through pipe 22 into heater A where it preheats the incoming petroleum, thence through pipe 24 into condenser E, and through pipe 1 to test-glass G'. (2) The condensate in heater A and in E passes through pipe 23 to the upper plate of column D. From here it passes off, together with the vapors from still B' condensed in the upper part of column D, through a coil in cooler F, issuing at test-glass $G^2$. It shows a density of about 0.68. (3) The least volatile fractions of the vapors from still B' condense in the lower portion of column D and pass through pipe 3 and cooler F into test-glass $G^3$. They have a density of about 0.70.

After having completed its path of travel in B', the volatile ingredients having been removed, the petroleum issues through pipe 6. Before entering the second still $B^2$, which is at a somewhat higher temperature than still B', it is preheated by passing through heater C, wherein it is heated by means subsequently to be described. From heater C it passes through pipe 7 into still $B^2$, in which it is caused to circulate in the same manner as above described in the case of still B'. In still $B^2$ it is heated by the vapors from still $B^3$, which are evolved from still $B^3$, and the fractions of a density of 0.720 to 0.740 are removed. These pass through opening f into space S', where they heat still B'. In space S' they travel through a circulatory path as previously described. The vapors not condensed in space S' pass out through pipe 10 and are condensed in cooler H. The condensate in space S' passes out through pipe 4 and cooler L to test-glass $K^4$, where it joins the condensate from pipe 10, leaving cooler H by pipe 34.

The petroleum then leaves still $B^2$ at 8 and it enters still $B^3$ at 9. In still $B^3$ it is deprived of vapors which have a density of up to 0.760. For this purpose a temperature of 180° C. is required. This is furnished in the present instance by a coil 25 containing steam at a pressure of 15 kilograms and at a temperature of 200° C. The vapors from still $B^3$ pass into space $S^2$ and circulate therethrough in the same manner as described for S'. The uncondensed vapors from $S^2$ pass out through pipe 11 and cooler H to test-glass $K^5$, where they meet the condensate from space $S^2$, which has issued through pipe 5 and cooler L.

The water condensed in steam pipe 25 in still $B^3$ is forced through purging gear 26 and through pipe 27 into heater C, where it preheats the petroleum passing from still B' to still $B^2$, as already described.

The petroleum in $B^3$ is now at a temperature of 180° C., and has been deprived of all spirits of a density of 0.760 and less. It is now drawn off at d and passes to the second triple-effect system, which operates under as high a degree of vacuum as it is possible to maintain. The use of a vacuum is advantageous in that it causes a reduction in quantity of the residual products, permits the use of indirect heating by superheated steam at a temperature of about 200° C., and hence, avoids cracking and coking in the final still, and makes stopping for cleaning unnecessary. By using very high vacuum and a heating temperature of about 200° C., it is possible to operate continuously and obtain a distillate of a density as high as 0.880 - 0.900.

Figure 4:
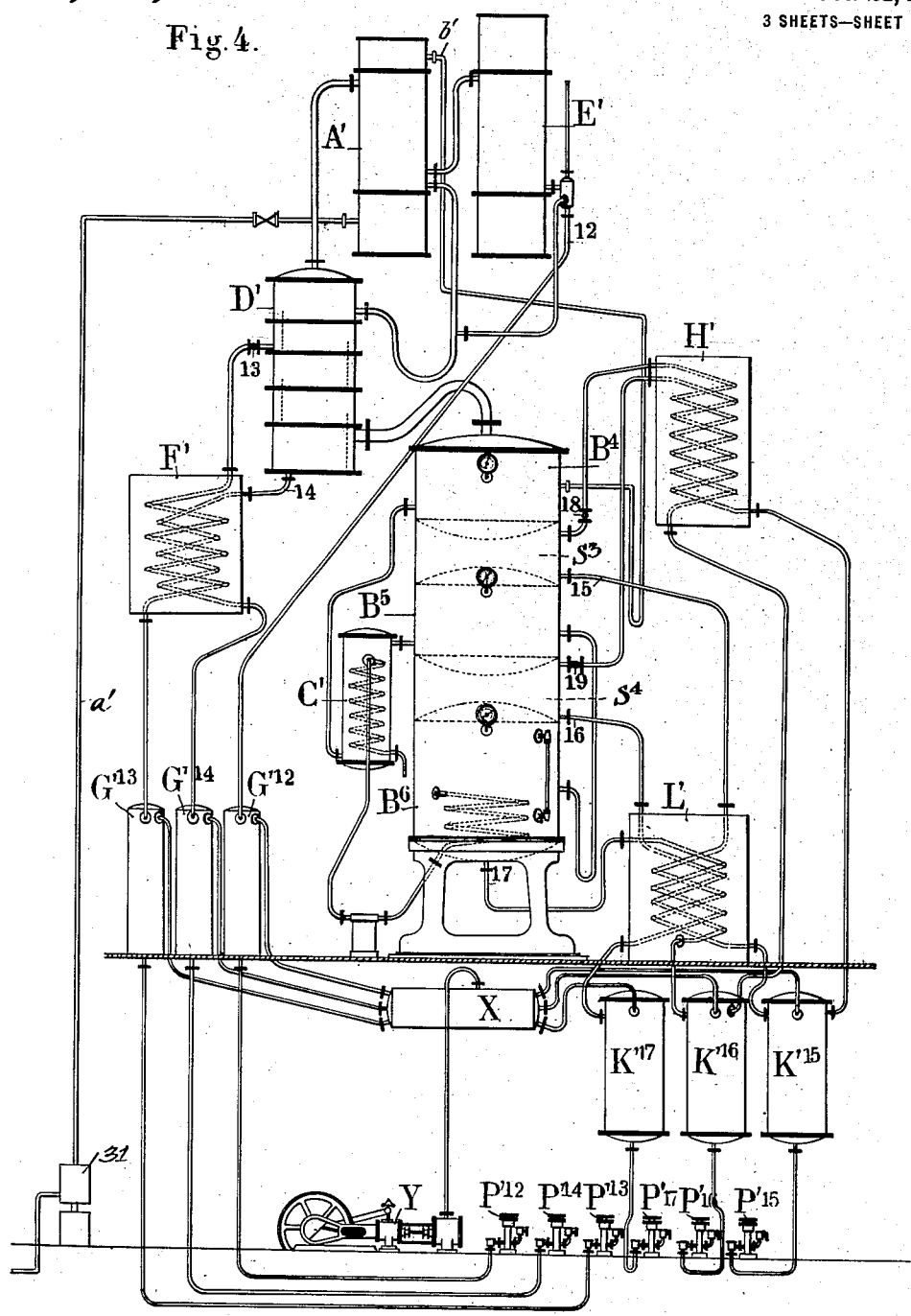
Fig. 4 is a diagrammatic view of the system used for the distillation under reduced pressure, said system being directly connected with the system of Fig. 1 and forming a part of the entire device.

The vacuum operating system (Fig. 4) is substantially the same as the system previously described, except for such modifications as are necessary for the use of a vacuum.

Under the high vacuum used the temperature at which the petroleum issuing from still $B^3$ of the system described will boil is about 100° C. Hence A', into which it is introduced through pipe $a'$, is a simple condenser. It is preliminarily heated therein, and next passes through pipe $b'$ into still $B^4$. The vapors issuing from $B^4$, together with those evolved from the superheated liquid, pass into column D' for fractional condensation. The most volatile portions pass through the top of column D' into condenser A' and E', issuing from 12. This fraction, which may be mixed with the heaviest fraction from the previous system, passes into measuring receptacles $G^{112}$, from which it is withdrawn by pump $P^{112}$. The second fraction, condensed in the top of column D', issue through pipe 13, passing through cooler F', into measuring receptacle $G^{113}$, from which it is withdrawn by pump $P^{113}$. It is a "kerosene de luxe." The heaviest fraction passes out through a pipe 14, and cooler F' to measuring receptacle $G^{114}$, from which it is withdrawn by pump $P^{114}$. It is an ordinary kerosene.

The petroleum passes from still $B^4$, through preheater C' to still $B^5$. The vapors from still $B^5$ pass into vapor chamber $S^3$, where they heat still $B^4$. The vapors uncondensed in $S^3$ pass out through pipe 18 and through cooler H' to measuring receptacle $K^{115}$, where they meet the condensed liquid from chamber $S^3$, which has passed through pipe 15 and coil L'. They are withdrawn from receptacle $K^{115}$ by pump $P^{115}$.

From still $B^5$ the petroleum passes to still $B^6$, heated by a coil containing steam at 200° C. The vapors pass into vapor chamber $S^4$, heating still $B^5$. The uncondensed and condensed vapors pass out through pipes 19 and 16, respectively, which pass through coolers H' and L', respectively, and the condensates are joined in measuring receptacle $K^{116}$, from which they are withdrawn by pump $P^{116}$.

The residue of vaselinous products remaining in still $B^6$ passes out through pipe 17 and cooler L' to receptacle $K^{117}$, from which it is withdrawn by pump $P^{117}$. The condensed water in the heating steam coil is used as a heating means in preheater C'.

All of the measuring receptacles are connected to the central vacuum chamber X, in which a constant vacuum is maintained by means of air pump Y.

It is apparent that direct heating may be used instead of steam heat, or that the entire device may be operated under atmospheric or under reduced pressure, or that an ordinary form of fractionating device may be substituted for a part of that here shown. Furthermore, the specific arrangement of the boilers with respect to each other is not essential to the invention.

I claim:

1. A process for the continuous distillation of petroleum or the like consisting in causing said liquid to flow continuously in segregated units maintained at successively higher temperatures and at atmospheric pressure, the highest temperature thereof being less than 200° C. fractionally and separately condensing the vapors from each unit, and subsequently causing the oil to flow in segregated units maintained at successively higher temperatures and at a pressure below atmospheric and separately condensing the vapors from each unit.

2. A continuous process for the multiple-effect distillation of volatile oil, petroleum, benzol and the like, consisting in subjecting the liquid to be distilled to two successive triple-effect distilling operations, one of which is carried out at atmospheric pressure and the other in a vacuum.

3. A continuous process for the multiple-effect distillation of volatile oil, petroleum, benzol and the like, consisting in subjecting the liquid to be distilled to two successive triple-effect distilling operations, in two series of boilers, one at atmospheric pressure and the other in a vacuum, and fractionally condensing the products of vaporization of each unit of said distilling operations.

4. A continuous process for the multiple-effect distillation of volatile oil, petroleum, benzol and the like, consisting in sending the liquid to be distilled into a first series of contiguous stills; heating the last and hottest still by steam under pressure; the contents of the stills being maintained at atmospheric pressure; circulating under each still and in a direction opposite to the direction of flow of the liquid, the vapors produced by the distillation of the liquid, in such manner that the vapors from one still will be employed to heat the liquid of the cooler contiguous still; passing the liquid to be distilled through these stills in such manner that it will flow from a cooler still to a hotter still; sending the liquid deprived of its most volatile substances by passing through the first series of stills, through a second series of stills in which the distillation is effected in the same manner as in the first series, a vacuum as perfect as possible being maintained in this second series of stills, so that the temperature of the last still will not exceed 200° C., whereby the cracking of petroleum will be avoided and steam under pressure can be used as the heating medium.

5. A process for the continuous distillation of crude petroleum or the like which consists in causing said liquid in segregated units to be maintained at successively higher temperatures, utilizing the vapors from each of said units after the first to heat the preceding unit and maintaining the heating vapors separate from the heated unit, and separately condensing the vapors given off by each unit.

6. An apparatus for the continuous distillation of crude petroleum comprising a column composed of a plurality of superposed stills adapted for multiple-effect operation, each still being heated by the vapors from the still immediately beneath it, and the lowermost still being heated by steam under pressure; means for collecting the condensed vapors and preventing same from falling back into the stills; a second column composed of a plurality of superposed stills, each still being heated by the vapors from the still immediately beneath it, and the lowermost still being heated by steam under pressure; means for collecting the condensed vapors and preventing same from falling back into the stills; and a vacuum pump branched on the said stills of the second mentioned column to produce therein a vacuum as perfect as possible.

7. An apparatus for the continuous distillation of crude petroleum comprising a column composed of three superposed stills adapted for triple-effect operation, each still being heated by the vapors from the still immediately beneath it, and the lowermost still being heated by steam under pressure; a second column composed of three superposed stills, each still being heated by the vapors from the still immediately beneath it, and the lowermost still being heated by steam under pressure; a vacuum pump branched on the stills of the said second column to produce therein a vacuum as perfect as possible; a convex double bottom in the lower part of each still of both columns with the exception of the lowermost still, said double bottom being upwardly convex, said double bottom being provided with an orifice intended for the passage of the vapors; and partitions in the chambers formed by the said double bottoms to force the vapors to follow a predetermined path.

The foregoing specification of my process and apparatus for the continuous rectification of spirits, petroleum and benzene signed by me this 27th day of March, 1914.

EMILE AUGUSTIN BARBET.

Witnesses:
   CHAS. P. PRESSLY,
   RENÉ THIRIOT.